(12) United States Patent
Wu

(10) Patent No.: US 11,250,338 B2
(45) Date of Patent: Feb. 15, 2022

(54) METHOD FOR ENHANCING ASSOCIATION RULES, APPARATUS USING THE SAME AND COMPUTER READABLE MEDIUM THEREFOR

(71) Applicant: INDUSTRIAL TECHNOLOGY RESEARCH INSTITUTE, Hsinchu (TW)

(72) Inventor: Xuan-Wei Wu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 642 days.

(21) Appl. No.: 15/395,289

(22) Filed: Dec. 30, 2016

(65) Prior Publication Data

US 2018/0150756 A1    May 31, 2018

(30) Foreign Application Priority Data

Nov. 29, 2016 (TW) .................... 105139284

(51) Int. Cl.
*G06N 5/04* (2006.01)
*G06N 20/00* (2019.01)
(Continued)

(52) U.S. Cl.
CPC ............. *G06N 5/046* (2013.01); *G06N 5/025* (2013.01); *G06N 7/005* (2013.01); *G06N 20/00* (2019.01); *G06Q 30/02* (2013.01)

(58) Field of Classification Search
CPC ........ G06N 5/046; G06N 20/00; G06N 5/025; G06N 7/005; G06Q 30/02
See application file for complete search history.

(56) References Cited

U.S. PATENT DOCUMENTS 6,266,649 B1    7/2001 Linden et al.
6,278,998 B1    8/2001 Ozden et al.
(Continued)

FOREIGN PATENT DOCUMENTS

CN    101084523 A    12/2007
CN    103020256 A    4/2013
(Continued)

OTHER PUBLICATIONS

Tew, C., et al. "Behavior-based clustering and analysis of interestingness measures for association rule mining." Data Mining and Knowledge Discovery 28.4 (2014): 1004-1045. (Year: 2014).*
(Continued)

*Primary Examiner* — Li B. Zhen
*Assistant Examiner* — Markus A. Vasquez
(74) *Attorney, Agent, or Firm* — Muncy, Geissler, Olds & Lowe, P.C.

(57) ABSTRACT

A method for enhancing association rules includes: performing an association rule algorithm to establish a list of established association rules, wherein the list of established association rules includes at least one antecedent item set, at least one consequent item set and at least one original confidence; performing minimization of a cost function to obtain vector(s) of the at least one antecedent item set and vector(s) of the at least one consequent item set according to the list of established association rules, wherein the vector(s) of the at least one antecedent item set and the vector(s) of the at least one consequent item set correspond to the at least one antecedent item set and the at least one consequent item set; and establishing an enhanced association list according to the vector(s) of the at least one antecedent item set and the vector(s) of the at least one consequent item set.

24 Claims, 5 Drawing Sheets

(51) Int. Cl.
  *G06N 5/02* (2006.01)
  *G06N 7/00* (2006.01)
  *G06Q 30/02* (2012.01)

(56) References Cited

U.S. PATENT DOCUMENTS

| | | | |
|---|---|---|---|
| 7,370,033 | B1 | 5/2008 | Roychowdhury |
| 8,392,281 | B1* | 3/2013 | Bashir .................. G06Q 30/06 705/26.1 |
| 8,812,543 | B2 | 8/2014 | Kanagasabapathi et al. |
| 8,983,888 | B2* | 3/2015 | Nice ........................ G06N 5/02 706/45 |
| 9,390,168 | B1* | 7/2016 | Dykstra ................ G06F 16/686 |
| 2006/0106665 | A1* | 5/2006 | Kumar ............... G06Q 30/0201 705/7.29 |
| 2011/0184894 | A1* | 7/2011 | Cohen ..................... G06N 5/02 706/12 |
| 2012/0066087 | A1 | 3/2012 | Zhang |
| 2014/0250092 | A1* | 9/2014 | Nakayama ............. G06N 5/025 707/694 |
| 2018/0107695 | A1* | 4/2018 | Yang .................. G06F 16/2282 |

FOREIGN PATENT DOCUMENTS

| CN | 104616178 | A | 5/2015 |
|---|---|---|---|
| CN | 105224507 | A | 1/2016 |
| TW | I372983 | B | 9/2012 |
| TW | 201426352 | A | 7/2014 |
| TW | I499290 | B | 9/2015 |
| TW | I522945 | B | 2/2016 |
| TW | M532610 | U | 11/2016 |

OTHER PUBLICATIONS

Koren et al., "Matrix Factorization Techniques for Recommender Systems," IEEE Computer Society; Aug. 2009; pp. 42-49.
Hu et al., "Collaborative Filtering for Implicit Feedback Datasets," Data Mining, 2008, ICDM '08, Eighth IEEE International Conference, Dec. 15-19, 2008, pp. 263-272.
Salakhutdinov et al., "Probabilistic Matrix Factorization," Nips, vol. 20, 2011, pp. 1-8.
Han et al., "Mining Frequent Patterns without Candidate Generation," ACM Sigmod Record, vol. 29, No. 2, 2000, pp. 1-12.
Agrawal et al., "Fast Algorithms for Mining Association Rules," Proceedings of the 20th VLDB Conference, vol. 1215, 1994, pp. 487-499.
Hung, "Data Mining in Fabrication," Thesis, National Taiwan University of Science and Technology, Department of Electrical Engineering, 2000, pp. 1-56.
Office Action dated Nov. 16, 2021 in CN Application No. 201611203732.6, 4 pages.

* cited by examiner

METHOD FOR ENHANCING ASSOCIATION RULES, APPARATUS USING THE SAME AND COMPUTER READABLE MEDIUM THEREFOR

This application claims the benefit of Taiwan application Serial No. 105139284, filed Nov. 29, 2016, the disclosure of which is incorporated by reference herein in its entirety.

TECHNICAL FIELD

The disclosure relates in general to a method for enhancing association rules, the apparatus using the same and a computer readable medium therefor.

BACKGROUND

Along with the stable growth of Internet and the rise of the Internet of Things (IoT) in recent years, a large volume of high speed and diversified data are generated. Through the analysis of collected data, such as the clients' purchase transactions, people in the business industries could understand their clients' preferences, and further adjust the items recommended to their clients to increase the volume of sales.

In each field, related association between the commodities, events or attributes of collected data could be analyzed by use of association rules. In the business industries, the association rules could be used as a reference in the display and arrangement of commodities and shelves. In the manufacturing process of semi-conductors, the association rules could be used in machine scheduling planning. In medical applications, the association rules could be used for analyzing the association degree between the characteristics of diseases to reduce misdiagnoses.

According to the association rules, for any antecedent item set that is given, normally a corresponding consequent item set could be obtained. However, in practice, it is often seen that after an antecedent item set is given, the number of corresponding consequent item sets is insufficient, and to the worse, there may exist not any corresponding consequent item sets and lead to a shortage of association rules.

SUMMARY

The disclosure is directed to a method for enhancing association rules, an apparatus using the same and a computer readable medium therefor, capable of finding unknown, potential rules to enhance the association rules by use of established association rules. Furthermore, the disclosure could enhance the association rules by use of the consequent item set corresponding to the subset of the antecedent item set according to the properties of the antecedent item set of association rules.

According to one embodiment, a method for enhancing association rules is provided. The enhancing method includes: performing an association rule algorithm to establish a list of established association rules, wherein the list of established association rules includes at least one antecedent item set, at least one consequent item set and at least one original confidence; performing minimization of a cost function to obtain vector(s) of the at least one antecedent item set and vector(s) of the at least one consequent item set according to the list of established association rules, wherein the vector(s) of the at least one antecedent item set and the vector(s) of the at least one consequent item set correspond to the at least one antecedent item set and the at least one consequent item set, respectively; and establishing an enhanced association list according to the vector(s) of the at least one antecedent item set and the vector(s) of the at least one consequent item set.

According to another embodiment, an apparatus for enhancing association rules is provided. The enhancing apparatus includes: a module for generating established association rules used for establishing a list of established association rules, wherein the list of established association rules includes at least one antecedent item set, at least one consequent item set and at least one original confidence; and a module for enhancing association rules used for performing minimization of a cost function to establish vector(s) of the at least one antecedent item set and vector(s) of the at least one consequent item set, wherein the vector(s) of the at least one antecedent item set and the vector(s) of the at least one consequent item set correspond to the at least one antecedent item set and the at least one consequent item set respectively.

According to an alternative embodiment, a computer readable medium having a software program stored therein is provided. When the software program is performed, an electronic apparatus with a controller performs a method for enhancing association rules, including: performing an association rule algorithm to establish a list of established association rules, wherein the list of established association rules includes at least one antecedent item set, at least one consequent item set and at least one original confidence; performing minimization of a cost function is performed to obtain vector(s) of the at least one antecedent item set and vector(s) of the at least one consequent item set according to the list of established association rules, wherein the vector(s) of the at least one antecedent item set and the vector(s) of the at least one consequent item set correspond to the at least one antecedent item set and the at least one consequent item set, respectively; and establishing an enhanced association list according to the vector(s) of the at least one antecedent item set and the vector(s) of the at least one consequent item set.

The above and other aspects of the disclosure will become better understood with regard to the following detailed description of the preferred but non-limiting embodiment(s). The following description is made with reference to the accompanying drawings.

DETAILED DESCRIPTION

Figure 1:
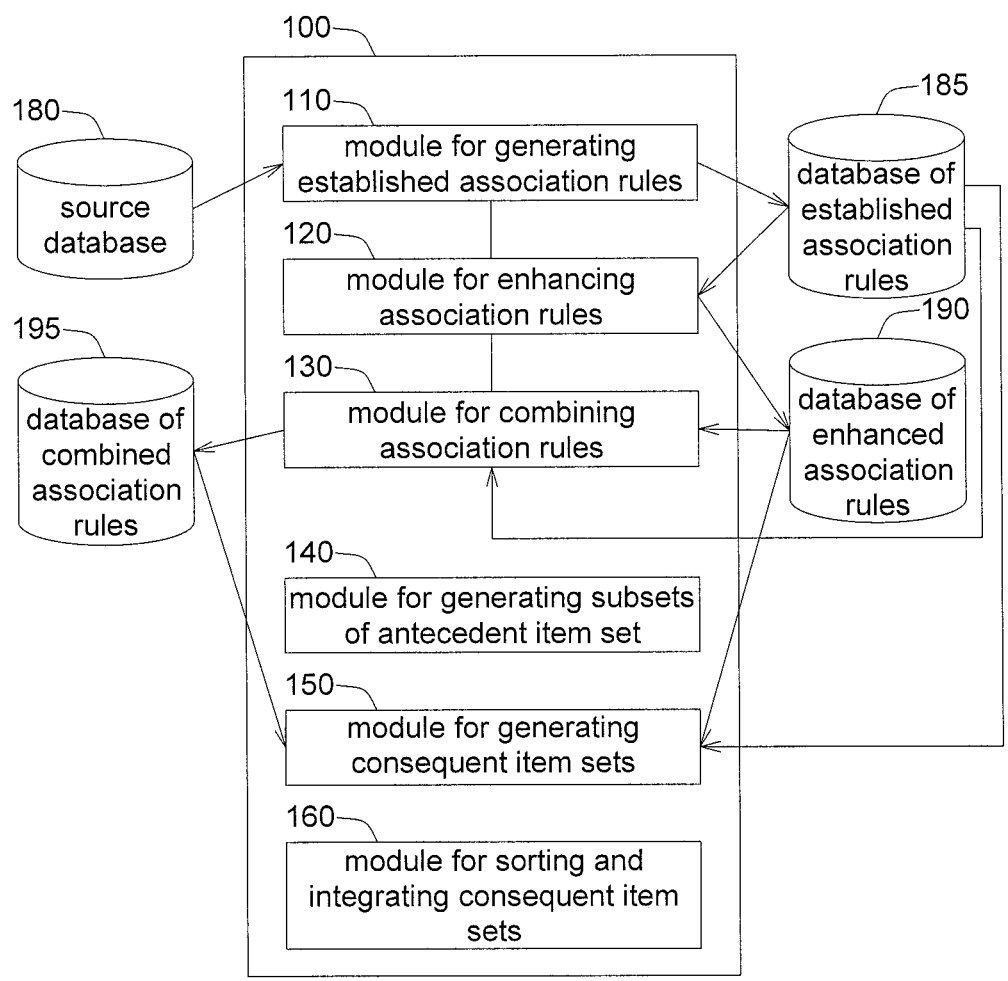
FIG. 1 is a schematic diagram of an apparatus for enhancing association rules according to an embodiment of the present disclosure.

The present disclosure is described with a number of embodiments. The present disclosure discovers unknown, potential rules by use of established association rules to enhance the association rules. Furthermore, the disclosure could enhance the association rules by use of the consequent item set corresponding to the subset of the antecedent item set. However, the embodiments are for exemplification purpose only, not for limiting the scope of protection of the present disclosure. Moreover, some of the elements are omitted in the embodiments to highlight the technical features of the disclosure.

In each field, through the analysis of association or correlation of collected data according to the association rules, the patterns or models of the concurrency of some attributes of a matter could be found. For example, in commercial applications, the association of the commodities that the clients put into their shopping baskets could be obtained through the analysis of clients' purchase data. Assume that the analysis shows that in the supermarkets, the commodity that most commonly purchased together with diaper is beer. Then, the display of commodities in the supermarkets could be adjusted to increase the sale. For example, when beer is displayed together with diaper, the sale of beer will be increased.

Also, in the semi-conductor manufacturing process, the combination of the machines used in the manufacturing process could be one of the factors that affect the yield rate. Therefore, the parameters of machines could be recorded, and the combination of machines that produces higher yield rate could be obtained according to the association rules and could be used as a basis in machine scheduling plan to improve the yield rate.

Since the collected data has a large volume and the association and correlation between the data cannot be directly obtained by use of labor, related algorithms of association rules, such as the Apriori algorithm and the FP-Growth algorithm, are provided. Established association rules could be obtained from the database by use of above algorithms, and a list of established association rules could further be established according to the established association rules.

According to the association rules, for an antecedent item set X that is given, a corresponding consequent item set Y could be obtained. The association rules could be expressed as: "antecedent item set X→consequent item set Y". Corresponding to the antecedent item set X and the consequent item set Y, a support and a confidence (original confidence) are included. The support under the association rule X→Y is the number of corresponding data including both X and Y, such as the number of transactions including both X and Y. The confidence under the association rules X→Y is the conditional probability $$\frac{P(X \cap Y)}{P(X)},$$

that is, the probability of Y given X. Any association rules match that match both a minimum support threshold and a minimum confidence threshold are preserved and added to the list of established association rules. The minimum support threshold and the minimum confidence threshold could be defined by the user.

Referring to FIG. 1, a schematic diagram of an apparatus for enhancing association rules according to an embodiment of the present disclosure is shown. The enhancing apparatus 100 includes a module for generating established association rules 110, a module for enhancing association rules 120 and a module for combining association rules 130. The module for generating established association rules 110 is used for performing an association rule algorithm to establish a list of established association rules. The module for enhancing association rules 120 is used for performing minimization of a cost function according to the list of established association rules to generate a list of enhanced association rules. The module for combining association rules 130 is used for combining the list of established association rules and the list of enhanced association rules to establish a combined list of association rules. The module for generating established association rules 110 is coupled to the module for enhancing association rules 120, which is further coupled to the module for combining association rules 130. The module for generating established association rules 110, the module for enhancing association rules 120 and the module for combining association rules 130 could be, for example, implemented by a chip, a circuit block in the chip, a firmware circuit, a circuit board having several electronic elements and wires, or a storage medium storing a number of program codes, and could also be implemented by performing a corresponding software or program using an electronic apparatus, such as a computer system or a server.

The enhancing apparatus 100 could exchange instructions and data with a source database 180, a database of established association rules 185, a database of enhanced association rules 190 and a database of combined association rules 195 by means of data transmission. In the present embodiment, the source database 180, the database of established association rules 185, the database of enhanced association rules 190 and the database of combined association rules 195 are disposed outside the enhancing apparatus 100, but the present disclosure is not limited thereto. For example, the source database 180, the database of established association rules 185, the database of enhanced association rules 190 and the database of combined association rules 195 could be disposed inside the enhancing apparatus 100.

Figure 2:
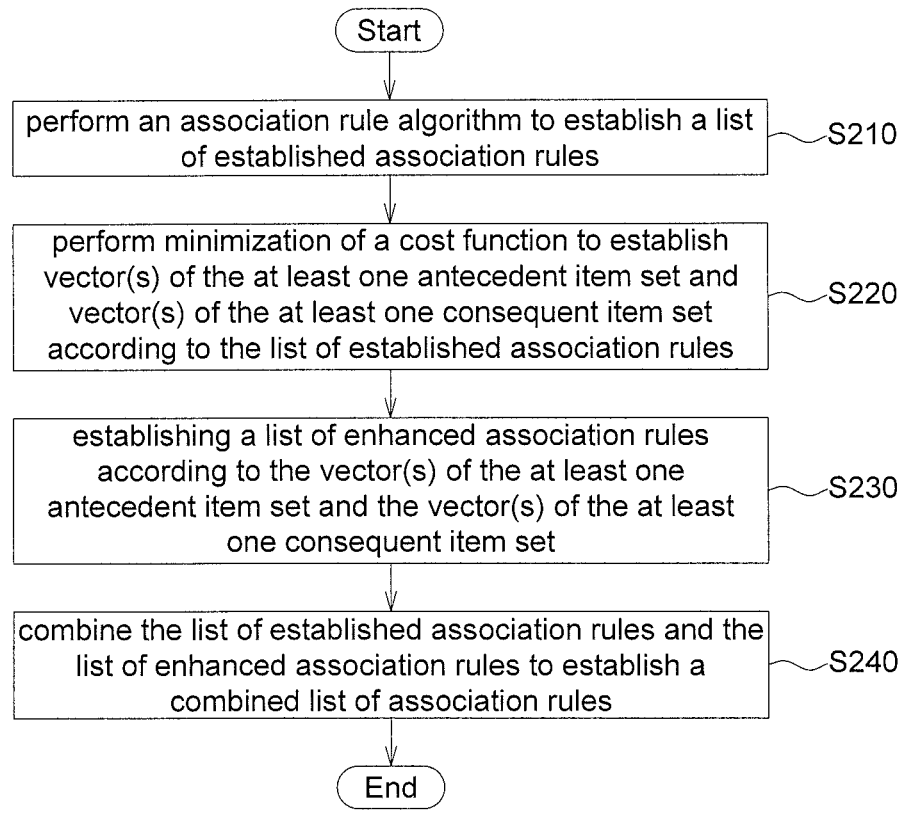
FIG. 2 is a flowchart of a method for enhancing association rules according to an embodiment of the present disclosure.

Referring to FIG. 2, a flowchart of a method for enhancing association rules according to an embodiment of the present disclosure is shown. Detailed descriptions regarding the operation of the above elements and the enhancing method of the enhancing apparatus of an embodiment of the present disclosure are disclosed below with the flowchart illustrated in FIG. 2. Anyone skilled in the technology field of the disclosure will understand that the enhancing method of an embodiment of the present disclosure is not limited to being used in the enhancing apparatus 100 of FIG. 1, and the sequence of steps as illustrated in the flowchart of FIG. 2 should be regarded in an illustrative sense rather than a restrictive sense.

Refer to FIG. 1 and FIG. 2. In an embodiment of the present disclosure, supermarket shopping is taken as an example. Within a fixed period of time, such as a half of a business day, a business day or five business days, transactions in the supermarket are as illustrated in Table 1. The transactions could be stored in the source database 180.

TABLE 1

| Items | Transactions |
| --- | --- |
| 1 | Tissue, High-Gluten Flour, Milk Powder |
| 2 | Sunflower Oil, Blue Ballpoint Pen |
| 3 | Green Tea, Iced Black Tea, Towel |
| 4 | Toothbrush, Lemon Juice, Glass Cleaner |
| 5 | Toast, Cheese, Milk |

TABLE 1-continued

| Items | Transactions |
| --- | --- |
| 6 | Diaper, Beer, Milk Powder |
| 7 | Mask, Eraser, Raincoat |
| 8 | ... |

In step S210, a list of established association rules is established after the module for generating established association rules 110 performs an association rule algorithm on the transactions. Firstly, a certain number of items of transaction are accessed from the transaction data to generate a training set. Then, the module for generating established association rules 110 analyzes the training set to obtain at least one antecedent item set, at least one consequent item set, and the corresponding original confidence of each of the at least one antecedent item set and its corresponding consequent item set. Lastly, the module for generating established association rules 110 establishes a list of established association rules as illustrated in Table 2 according to the at least one antecedent item set, the at least one consequent item set and the at least one original confidence. The list of established association rules could be stored in the database of established association rules 185.

TABLE 2

| Antecedent Item Set | Consequent Item Set | Original Confidence |
| --- | --- | --- |
| {Toast, Cheese} | {Milk} | 0.58 |
| {Lemon Juice} | {Glass Cleaner} | 0.17 |
| {Diaper} | {Beer} | 0.3 |
| ... | ... | ... |

In step S220, minimization of a cost function is performed by the module for enhancing association rules 120 to establish vector(s) of the at least one antecedent item set and vector(s) of the at least one consequent item set according to the list of established association rules. The vector(s) of the at least one antecedent item set and the vector(s) of the at least one consequent item set correspond to at least one antecedent item set and at least one consequent item set, respectively.

In step S230, a list of enhanced association rules as illustrated in Table 3 is generated by the module for enhancing association rules 120 according to the vector(s) of the at least one antecedent item set and the vector(s) of the at least one consequent item set. The list of enhanced association rules could be stored in the database of enhanced association rules 190.

TABLE 3

| Antecedent Item Set | Consequent Item Set | Predictive confidence |
| --- | --- | --- |
| {Toast, Cheese} | {Milk} | 0.57 |
| {Lemon Juice} | {Glass Cleaner} | 0.18 |
| {Diaper} | {Beer} | 0.28 |
| ... | ... | ... |
| {Lemon Juice} | {Milk} | 0.43 |
| {Mask} | {Eraser} | 0.05 |
| ... | ... | ... |

Lastly, the method performs step S240, the list of established association rules and the list of enhanced association rules are combined by the module for combining association rules 130 to establish a combined list of association rules. The combined list of association rules could be stored in the database of combined association rules 195.

With regard to the above steps of establishing the combined list of association rules, in an embodiment of the present disclosure, the user could define a predictive confidence threshold. For example, the user could define the predictive confidence threshold as 0.1. The module for combining association rules 130 could select those association rules having a predictive confidence greater than the predictive confidence threshold from the list of enhanced association rules to establish the combined list of association rules as illustrated in Table 4. The content values in the combined confidence column of the combined list of association rules are used as the content values in the predictive confidence column of the list of enhanced association rules.

TABLE 4

| Antecedent item set | Consequent item set | Combined confidence |
| --- | --- | --- |
| {Toast, Cheese} | {Milk} | 0.57 |
| {Lemon Juice} | {Glass Cleaner} | 0.18 |
| {Diaper} | {Beer} | 0.28 |
| ... | ... | ... |
| {Lemon Juice} | {Milk} | 0.43 |
| ... | ... | ... |

In another embodiment of the present disclosure, the module for combining association rules 130 could perform sorting on the consequent item set corresponding to the same antecedent item set in the list of enhanced association rules according to the corresponding predictive confidence. A combined list of association rules could be established according to the first n enhanced association rules in the sort order, n is a positive integer. The content values in the combined confidence column of the combined list of association rules are the content values in the predictive confidence column of the list of enhanced association rules.

The present disclosure provides another method for generating the combined list of association rules. The user could define a predictive confidence threshold. For example, the user could define the predictive confidence threshold as 0.1. Firstly, the content values in the list of established association rules are accessed by the module for combining association rules 130 and used as some of the content values in the combined list of association rules. The content values in the combined confidence column of the combined list of association rules are the content values in the original confidence column of the list of established association rules. Then, those association rules having a predictive confidence greater than the predictive confidence threshold and existing in the list of enhanced association rules but not the list of established association rules are added to the combined list of association rules. For those association rules not existing in the list of established association rules, their content values in the combined confidence column of the combined list of association rules are the content values in the predictive confidence column of the list of enhanced association rules.

Anyone skilled in the technology field of the disclosure will understand that the method of the present disclosure for combining the list of established association rules and the list of enhanced association rules is not limited to the combining method disclosed in above embodiments. Any combining method capable of accessing at least a part of the enhanced association rules to generate more consequent item sets than the consequent item sets included in the list of established association rules could be used for generating the combined list of association rules.

Figure 3:
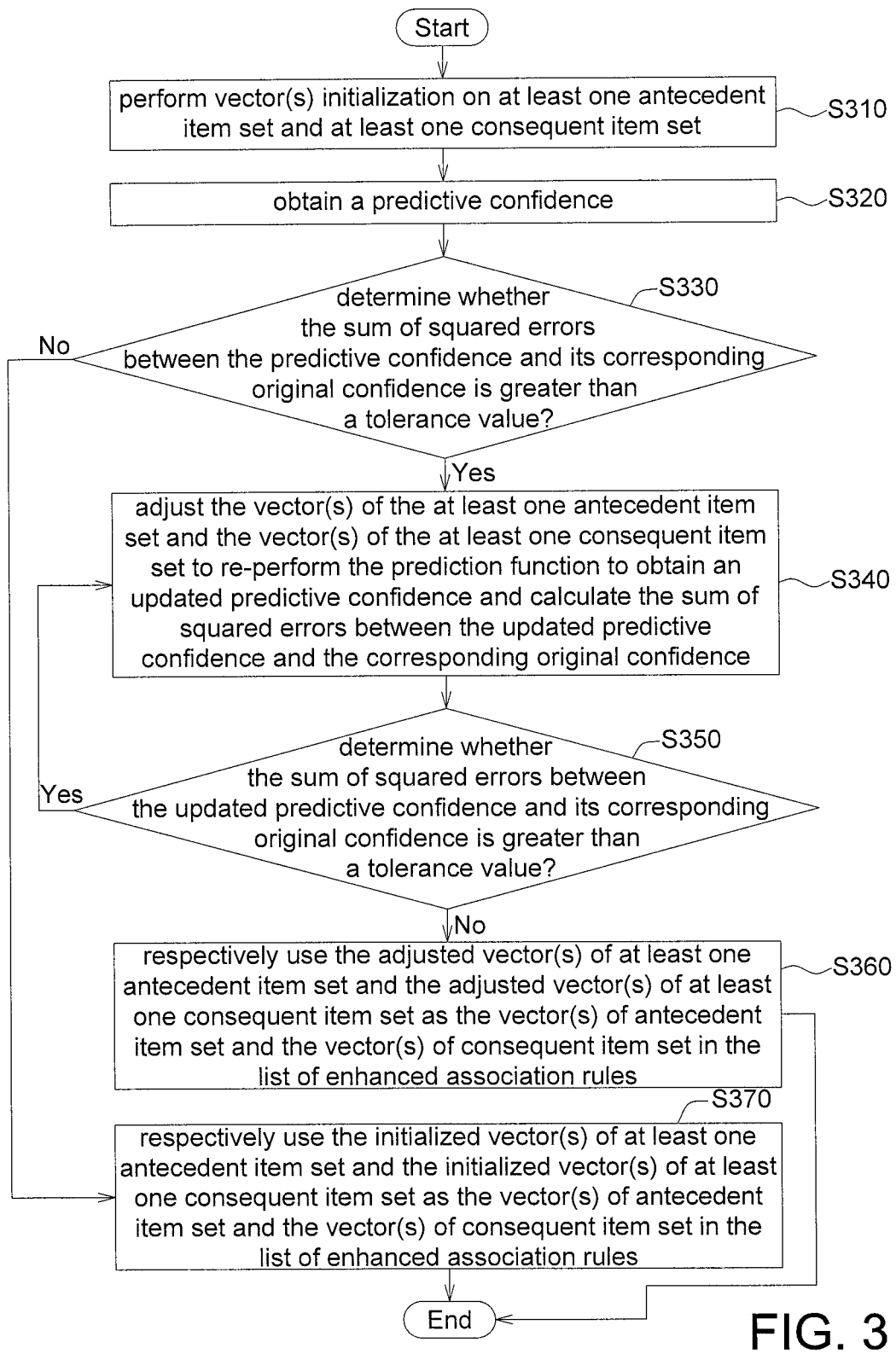
FIG. 3 is a flowchart of a step of performing minimization of a cost function to establish vector(s) of the at least one antecedent item set and vector(s) of the at least one consequent item set according to a list of association rules of an embodiment of the present disclosure.

Referring to FIG. 3, a flowchart of a step of performing minimization of a cost function to establish vector(s) of the at least one antecedent item set and vector(s) of the at least one consequent item set according to a list of association rules of an embodiment of the present disclosure is shown. In step S220 of FIG. 2, minimization of a cost function is performed by the module for enhancing association rules 120 to establish vector(s) of the at least one antecedent item set and vector(s) of the at least one consequent item set according to the list of established association rules. Detailed procedures of step S220 of FIG. 2 of performing minimization of a cost function according to the list of established association rules are described in steps S310~S350 of FIG. 3.

The step of performing minimization of a cost function basically includes following sub-steps: (a) performing vector initialization on at least one antecedent item set and at least one consequent item set, and then performing a prediction function to obtain a predictive confidence according to at least one initialized vector(s) of antecedent item set and at least one initialized vector(s) of the at least one consequent item set; (b) determining whether the sum of squared errors between the current predictive confidence and the original confidence is greater than a tolerance value; if no, performing step (c); if yes, performing step (d); (c) using the currently obtained vector(s) of the at least one antecedent item set and the currently obtained vector(s) of the at least one consequent item set as the vector(s) of the at least one antecedent item set and the vector(s) of the at least one consequent item set in the list of enhanced association rules; (d) adjusting the vector(s) of the at least one antecedent item set and the vector(s) of the at least one consequent item set to re-perform the prediction function to obtain an updated predictive confidence, calculating the sum of squared errors between the updated predictive confidence and the corresponding original confidence, and performing step (b).

In an embodiment of the present disclosure, minimization of a cost function could be exemplified by minimization of the cost function in a latent factor model which could be expressed as:

$$\min_{q^*, p^*} \sum_{(u,i) \in K} (r_{u,i} - q_i^T p_u)^2,$$

wherein $r_{u,i}$ denotes an original confidence; $p_u$ denotes a u-th vector of antecedent item set; $q_i$ denoted an i-th vector of consequent item set; K denotes an database of established association rules; both u and i are a positive integer. Minimization of a cost function could be achieved by, for example, adjusting the vector of antecedent item set $p_u$ and the vector of consequent item set $q_i$ to make the result of vector dot product $q_i^T p_u$ of the vector of antecedent item set $p_u$ and the vector of consequent item set $q_i(q_i^T p_u$ is also referred as prediction function; the predictive confidence $\hat{r}_{u,i}$ is expressed as: $\hat{r}_{u,i} = q_i^T p_u$) most closest to the original confidence $\hat{r}_{u,i}$. That is, the sum of squared errors between the result of vector dot product $q_i^T p_u$ (the predictive confidence $\hat{r}_{u,i}$) and the original confidence $r_{u,i}$ is minimized to obtain the vector of antecedent item set $p_u$ and the vector of consequent item set $q_i$.

Refer to both FIG. 1 and FIG. 3. Detailed procedures of performing minimization of a cost function are described below. As disclosed above, minimization of a cost function could be achieved by adjusting the vector of antecedent item set $p_u$ and the vector of consequent item set $q_i$ to minimize the sum of squared errors between the result of vector dot product $q_i^T p_u$ (predictive confidence $\hat{r}_{u,i}$) and the original confidence $r_{u,i}$. During the adjustment procedure, $p_u$ (x) and $q_i$ (x) respectively denote a vector in the x-th round of calculation; $\hat{r}_{u,i}(x)$ denotes a predictive confidence in the x-th round of calculation, and x is a positive integer. In step S310 of FIG. 3, firstly, the module for enhancing association rules 120 performs vector initialization on at least one antecedent item set and at least one consequent item set to generate vector(s) of the at least one antecedent item set $p_u(0)$ and vector(s) of the at least one consequent item set $q_i(0)$, respectively, wherein $p_u(0)$ denotes at least one initialized vector(s) of antecedent item set; $q_i(0)$ denotes at least one initialized vector(s) of consequent item set. Let the list of established association rules having two association rules be taken as an example. In the list of established association rules, suppose the original confidence $r_{1,1}$ between the first antecedent item set and its corresponding first consequent item set under the first association rule is 0.67, and the original confidence $r_{2,2}$ between the second antecedent item set and its corresponding second consequent item set under the second association rule is 0.53. After vector initialization is performed on the said antecedent item sets and their corresponding consequent item sets, suppose the initial vector of the first antecedent item set is $p_1(0) = \{0.8, 0.9, -0.6\}^T$ and the initial vector of the first corresponding consequent item set is $q_1(0) = \{0.8, 0.7, 0.5\}^T$, the initial vector of the second antecedent item set is $p_2(0) = \{0.9, 0.8, -0.5\}^T$ and the initial vector of the corresponding second consequent item set is $q_2(0) = \{0.7, 0.9, 0.4\}^T$, and the above vectors are 3D vectors, for example. The dimension of vectors could be defined by the user. For example, the dimension of vectors could be 3D, 4D, 5D or any dimensions, and is not limited to the above exemplifications.

In step S320, a predictive confidence $\hat{r}_{u,i}$ is obtained according to the initialized vector of antecedent item set $p_u(0)$ and the vector of consequent item set $q_i(0)$. Given that the initial vector of the first antecedent item set is $p_1(0) = \{0.8, 0.9, -0.6\}^T$, the vector of the first corresponding consequent item set is $q_1(0) = \{0.8, 0.7, 0.5\}^T$, the initial vector of the second antecedent item set is $p_2(0) = \{0.9, 0.8, -0.5\}^T$, and the vector of the corresponding second consequent item set is $q_2(0) = \{0.7, 0.9, 0.4\}^T$, it could be calculated that the predictive confidence $\hat{r}_{1,1}(0)$ is 0.97 and $\hat{r}_{2,2}(0)$ is 1.15.

In step S330, the sum of squared errors between the predictive confidence $\hat{r}_{u,i}(0)$ and its corresponding original confidence $r_{u,i}$ is calculated, and whether the sum of squared errors between the predictive confidence $\hat{r}_{u,i}(0)$ and its corresponding original confidence $r_{u,i}$ is greater than a tolerance value is determined. The tolerance value could be defined by the user. If it is determined that the sum of squared errors between the predictive confidence $\hat{r}_{u,i}(0)$ and its corresponding original confidence $r_{u,i}$ is greater than a tolerance value, then the method performs step S340. For example, suppose the tolerance value is defined as 0.4, the predictive confidence $\hat{r}_{1,1}(0)$ is 0.97, the original confidence $r_{1,1}$ is 0.67, the predictive confidence $\hat{r}_{2,2}(0)$ is 1.15, and the original confidence $r_{2,2}$ is 0.53, then the sum of squared errors $$\sum_{(u,i) \in K} (r_{u,i} - q_i(0)^T p_u(0))^2$$

between the predictive confidence $\hat{r}_{u,i}(0)$ and its corresponding original confidence $r_{u,i}$ could be calculated as:

$$\sum_{(u,i)\in K} (r_{u,i} - q_i(0)^T p_u(0))^2 = (r_{1,1} - q_1(0)^T p_1(0))^2 + (r_{2,2} - q_2(0)^T p_2(0))^2 =$$

$$(r_{1,1} - \hat{r}_{1,1}(0))^2 + (r_{2,2} - \hat{r}_{2,2}(0))^2 =$$

$$(0.67 - 0.97)^2 + (0.53 - 1.15)^2 = 0.4744$$

Since the sum of squared errors $$\sum_{(u,i)\in K} (r_{u,i} - q_i(0)^T p_u(0))^2$$

between the predictive confidence $\hat{r}_{u,i}(0)$ and its corresponding original confidence $r_{u,i}$ being 0.4744 is greater than the tolerance value 0.4, the method performs step S340.

In step S340, the initialized vector of antecedent item set $p_u(0)$ and the initialized vector of consequent item set $q_i(0)$ are adjusted by the module for enhancing association rules 120 to generate the vector of antecedent item set $p_u(1)$ and the vector of consequent item set $q_i(1)$, and the prediction function is re-performed to establish an updated predictive confidence $\hat{r}_{u,i}(1)$, and the sum of squared errors between the updated predictive confidence $\hat{r}_{u,i}(1)$ and its corresponding original confidence $r_{u,i}$ is calculated. For example, the vector of the first antecedent item set is adjusted as $p_1(1)=\{0.8, 0.8, -0.6\}^T$, the vector of the first corresponding consequent item set is adjusted as $q_1(1)=\{0.7, 0.7, 0.5\}^T$, the vector of the second antecedent item set is adjusted as $p_2(1)=\{0.7, 0.8, -0.5\}^T$, and the vector of the corresponding second consequent item set is adjusted as $q_2(1)=\{0.7, 0.7, 0.4\}^T$, so the predictive confidence $\hat{r}_{1,1}(1)$ is calculated as 0.82, and $\hat{r}_{2,2}(1)$ is calculated as 0.85. Thus, $$\sum_{(u,i)\in K} (r_{u,i} - q_i(1)^T p_u(1))^2 = (r_{1,1} - q_1(1)^T p_1(1))^2 + (r_{2,2} - q_2(1)^T p_2(1))^2 =$$

$$(r_{1,1} - \hat{r}_{1,1}(1))^2 + (r_{2,2} - \hat{r}_{2,2}(1))^2 =$$

$$(0.67 - 0.82)^2 + (0.53 - 0.85)^2 = 0.1249$$

Meanwhile, $$\sum_{(u,i)\in K} (r_{u,i} - q_i(1)^T p_u(1))^2$$

has a value being 0.1249 smaller than the tolerance value being 0.4.

In step S350, whether the sum of squared errors between the updated predictive confidence $\hat{r}_{u,i}(x)$ and its corresponding original confidence $r_{u,i}$ is greater than a tolerance value is determined. If it is determined that the sum of squared errors between the updated predictive confidence $\hat{r}_{u,i}(x)$ and its corresponding original confidence $r_{u,i}$ is greater than the tolerance value, step S340 is repeated until the sum of squared errors between the updated predictive confidence $\hat{r}_{u,i}(x)$ and its corresponding original confidence $r_{u,i}$ is smaller than or equivalent to the tolerance value.

If it is determined that the sum of squared errors between the updated predictive confidence $\hat{r}_{u,i}(x)$ and its corresponding original confidence $r_{u,i}$ is smaller than or equivalent to the tolerance value, then the method performs step S360. The adjusted vector of antecedent item set $p_u$ (x) and the adjusted vector of consequent item set $q_i$ (x) are respectively used as the vector of antecedent item set $p_u'$ and the vector of consequent item set $q_i'$ in the list of enhanced association rules (in S370). For example, since the value of $$\sum_{(u,i)\in K} (r_{u,i} - q_i(1)^T p_u(1))^2$$

is smaller than the tolerance value being 0.4, in step S350, it could be determined that the sum of squared errors between the updated predictive confidence $\hat{r}_{u,i}(x)$ (in the above example, $\hat{r}_{u,i}(1)$) and its corresponding original confidence $r_{u,i}$ is smaller than the tolerance value. Therefore, the vector of the adjusted first antecedent item set $p_1(1)\{0.8, 0.8, -0.6\}^T$, the vector of the adjusted first consequent item set $q_1(1)=\{0.7, 0.7, 0.5\}^T$, the vector of the adjusted second antecedent item set $p_2(1)=\{0.7, 0.8, -0.5\}^T$, and the vector of the adjusted second consequent item set $q_2(1)=\{0.7, 0.7, 0.4\}^T$ are respectively used as the vector of the first antecedent item set $p_1'$, the vector of the first consequent item set $q_1'$, the vector of the second antecedent item set $p_2'$, and the vector of the second consequent item set $q_2'$ in the list of enhanced association rules.

In step S230, the list of enhanced association rules is obtained according to the vector of the first antecedent item set $p_1'$, the vector of the first consequent item set $q_1'$, the vector of the second antecedent item set $p_2'$, and the vector of the second consequent item set $q_2'$. The module for enhancing association rules 120 could generate the list of enhanced association rules as illustrated in Table 3 according to the vector(s) of the at least one antecedent item set (such as $p_1'$ and $p_2'$) and the vector(s) of the at least one consequent item set (such as $q_1'$ and $q_2'$). For example, the predictive confidence $\hat{r}_{2,1}$, $\hat{r}_{2,1}=q_1^T p_2$ could be calculated to obtain the predictive confidence under a new association rule "$p_2 \rightarrow q_1$" and enhance the new association rule. For example, the predictive confidence (for example, $\hat{r}_{2,1}=q_1^T p_2$) under the association rule "the antecedent item set {Lemon Juice}→the consequent item set {Milk}" in the third row of Table 3 could be calculated according to the antecedent item set {Lemon Juice} (corresponding to, for example, $p_2'$) in the second row of Table 3 and the consequent item set {Milk} (corresponding to, for example, $q_1'$) in the first row of Table 3 to generate a new association rule "the antecedent item set {Lemon Juice}→the consequent item set {Milk}" to enhance the association rules.

The above calculation of minimizing a cost function could be, for example, optimized by a stochastic gradient descent (SGD) method. For example, in each round of calculation, a gain value $e_{u,i}$ could be defined. The gain value for the x-th round of calculation is defined as $e_{u,i}(x)=(r_{u,i}(x)-q_i^T(x)p_u(x))$, and could be used for defining $q_i(x+1)=q_i(x)+\gamma\cdot(e_{u,i}\cdot p_u(x))$, $p_u(x+1)=p_u(x)+\gamma\cdot(e_{u,i}\cdot q_i(x))$ for the (x+1)-th round of calculation, wherein $\gamma$ denotes a learning rate which is used for controlling the size of adjustment. The direction of adjustment moves toward a negative gradient of the cost function, such that the gain value $e_{u,i}$ gradually diminishes with each round of calculation until the gain value $e_{u,i}$ is smaller than a tolerance value.

It should be understood that the predictive confidence $\hat{r}_{u,i}$ could be obtained according to the prediction function $\hat{r}_{u,i}=q_i^T p_u$ (that is, the vector dot product of the vector of antecedent item set $p_u$ and the vector of consequent item set $q_i$) as well as other prediction functions (such as $\hat{r}_{u,i}=q_i^T p_u + b_u + b_i + \mu$ or $\hat{r}_{u,i}=b_u+b_i+\mu-(p_u-q_i)^T(p_u-q_i)$), wherein $b_u$, $b_i$, $\mu$ denote bias terms. The optimum solution of the vector of antecedent item set or the vector of consequent item set could be found by using the cost function minimization method or other method such as the alternating least square method. The above prediction function and the cost function minimization method are for exemplary and explanatory purposes only, and the present disclosure is not limited thereto.

Figure 4:
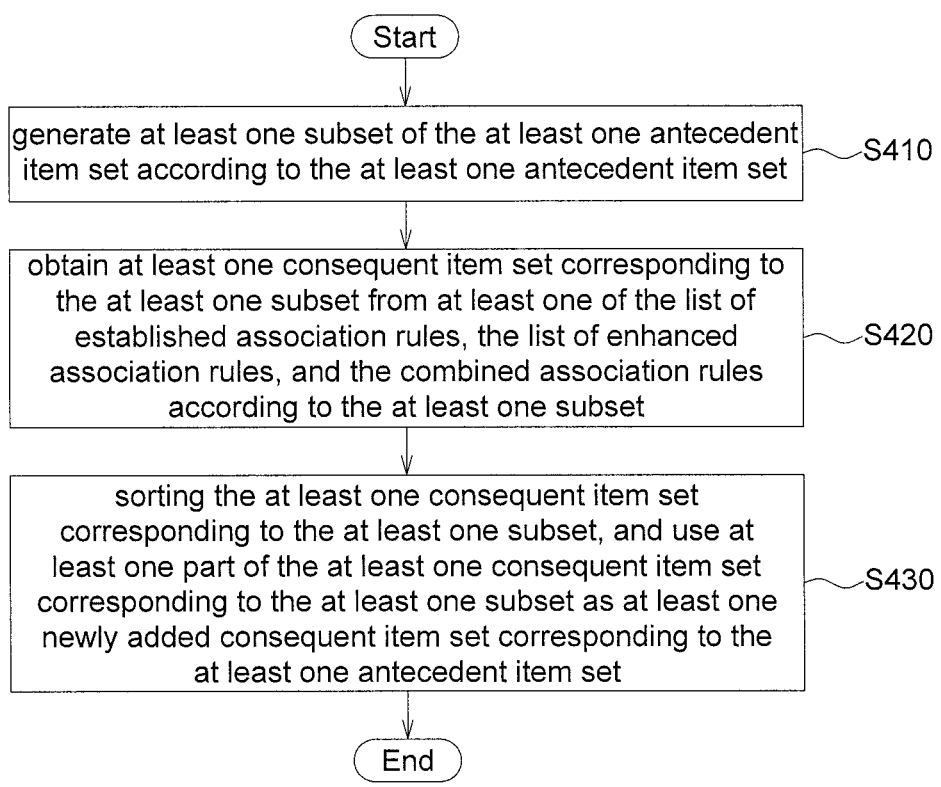
FIG. 4 is a flowchart of a step of generating at least one consequent item set corresponding to the antecedent item set according to at least one subset of the antecedent item set according to an embodiment of the present disclosure.

Refer to FIG. 1 and FIG. 4. FIG. 4 is a flowchart of a step of generating at least one consequent item set corresponding to the antecedent item set according to at least one subset of the antecedent item set according to an embodiment of the present disclosure. In the present embodiment, the enhancing apparatus 100 further includes a module for generating subsets of antecedent item set 140, a module for generating consequent item sets 150 and a module for sorting and integrating consequent item sets 160.

If the target antecedent item set does not have a corresponding consequent item set in the list of established association rules, the list of enhanced association rules or the combined list of association rules (that is, no association rule corresponding to the antecedent item set could be found in the list of established association rules, the list of enhanced association rules or the combined list of association rules), then the method illustrated in FIG. 4 could be used to add new antecedent item set, its corresponding consequent item set, and association rule. For example, if the target antecedent item set is {Outfield Glove, Batting Glove}, but no association rules with antecedent item set {Outfield Glove, Pitcher Glove} could be found in the list of established association rules, the list of enhanced association rules or the combined list of association rules, then the method illustrated in FIG. 4 could be used to add the antecedent item set {Outfield Glove, Batting Glove}, and its corresponding consequent item set and association rule.

In step S410, a subset of the antecedent item set is generated by the module for generating subsets of antecedent item set 140 according to the antecedent item set {Outfield Glove, Pitcher Glove}. Examples of the subset include {Outfield Glove} and {Pitcher Glove}.

In the present embodiment, the module for generating consequent item sets 150 could discover the consequent item sets and the association rules corresponding to the subset {Outfield Glove} and {Pitcher Glove} as illustrated in Table 5 from the list of established association rules, the list of enhanced association rules or the combined list of association rules.

TABLE 5

| Antecedent Item Set | Consequent Item Set | Original Confidence |
| --- | --- | --- |
| {Outfield Glove} | {Batting Glove} | 0.6 |
| {Outfield Glove} | {Bat} | 0.5 |
| {Outfield Glove} | {Sparked Shoes} | 0.4 |
| {Pitcher Glove} | {Sparked Shoes} | 0.5 |
| {Pitcher Glove} | {Batting Glove} | 0.2 |
| {Pitcher Glove} | {Bat} | 0.1 |

Then, the module for sorting and integrating consequent item sets 160 could perform sorting on the association rules corresponding to the subset {Outfield Glove} and {Pitcher Glove} according to a predetermined rule. The predetermined rule is based on the sorting of the confidence of the original confidence of the consequent item set corresponding to the subset, and assigns sorting scores. For example, the association rule ranked first scores 2 marks, the association rule ranked second scores 1 mark, and the association rule ranked third scores 0 mark. A list of sorting scores for the consequent item set is illustrated in Table 5(a).

TABLE 5(a)

| Antecedent Item Set | Consequent Item Set | Original Confidence | Sorting Scores |
| --- | --- | --- | --- |
| {Outfield Glove} | {Batting Glove} | 0.6 | 2 |
| {Outfield Glove} | {Bat} | 0.5 | 1 |
| {Outfield Glove} | {Sparked Shoes} | 0.4 | 0 |
| {Pitcher Glove} | {Sparked Shoes} | 0.5 | 2 |
| {Pitcher Glove} | {Batting Glove} | 0.2 | 1 |
| {Pitcher Glove} | {Bat} | 0.1 | 0 |

Then, the sorting scores of the association rules corresponding to the consequent item set are summed up. For example, the sorting scores of the association rules corresponding to the consequent item set {Batting Glove} are 2 marks and 1 mark, respectively, so the sum of the sorting scores is 3 marks. Similarly, the sum of the sorting scores of the association rules corresponding to the consequent item set {Sparked Shoes} is 2 marks, and the sum of the sorting scores of the association rules corresponding to the consequent item set {Bat} is 1 mark. Lastly a sorting list of the consequent item sets {Batting Glove}, {Sparked Shoes}, {Bat} could be obtained by sorting the sums in a descending order, and the sorting list of the consequent item set could be used as the consequent item set which corresponds to the antecedent item set {Outfield Glove, Pitcher Glove} but does not exist originally. That is, the consequent item sets {Batting Glove}, {Sparked Shoes}, {Bat} are newly added.

In another embodiment of the present disclosure, the predetermined rule could be the calculation of an average original confidence. The average original confidence of the consequent item set corresponding to the subset is calculated. For example, when the original confidences corresponding to the consequent item set {Sparked Shoes} are 0.4 and 0.5, respectively, the average original confidence is calculated as 0.45. Similarly, when the original confidences corresponding to the consequent item set {Batting Glove} are 0.6 and 0.2, respectively, the average original confidence is calculated as 0.4; when the original confidences corresponding to the consequent item set {Bat} are 0.5 and 0.1, respectively, the average original confidence is calculated as 0.3. A sorting list of the consequent item sets {Sparked Shoes}, {Batting Glove}, {Bat} could be obtained by sorting the average original confidences in a descending order, and the sorting list of the consequent item sets could be used as the consequent item set corresponding to the antecedent item set {Outfield Glove, Pitcher Glove} which does not exist originally. In the present embodiment, the average original confidences 0.45, 0.4, 0.3 corresponding to the consequent item sets {Sparked Shoes}, {Batting Glove}, {Bat} respectively are used as the confidences of the antecedent item set {Outfield Glove, Pitcher Glove} corresponding to the consequent item sets {Sparked Shoes}, {Batting Glove}, {Bat} respectively. It should be understood that any system or method which performs sorting according to the consequent item sets corresponding to at least one subset of the antecedent item set is within the scope of protection of the present disclosure.

In another embodiment of the present disclosure, a constraint is constructed according to the scenario of use so that the antecedent item set applicable to the scenario, and its corresponding consequent item set and association rules could be accessed. Let the shopping of Internet recommended commodities be taken for example. Suppose an Internet shopper has already browsed Women's Handbags a, Whisky b, and Neck Decoration c, and the browsing history shows that the shopping site recommends related commodities including Brandy d, Women's Purses e, Women's Scarves f, Women's Purses g and Women's Handbags h for the Internet shopper's reference. In the present scenario, the antecedent item set is {Women's Handbags a, Whisky b, Neck Decoration c}, and its corresponding consequent item set is {Brandy d, Women's Purses e, Women's Scarves f, Women's Purses g, Women's Handbags h}.

Since the related commodities that the Internet shopper wishes to discover are handbags and walls, the Internet shopper adds a constraint of commodity category "Handbags and Wallets". After filtering the commodities according to the constraint, the shopping site recommends Women's Purses e, Women's Purses g and Women's Handbags h for the Internet shopper's reference, and excludes the related commodities not matching the constraint, such as Brandy d and Women's Scarves f. However, after the related commodities not matching the constraint are excluded, the items of related commodities recommended by the shopping site may become insufficient.

Figure 5:
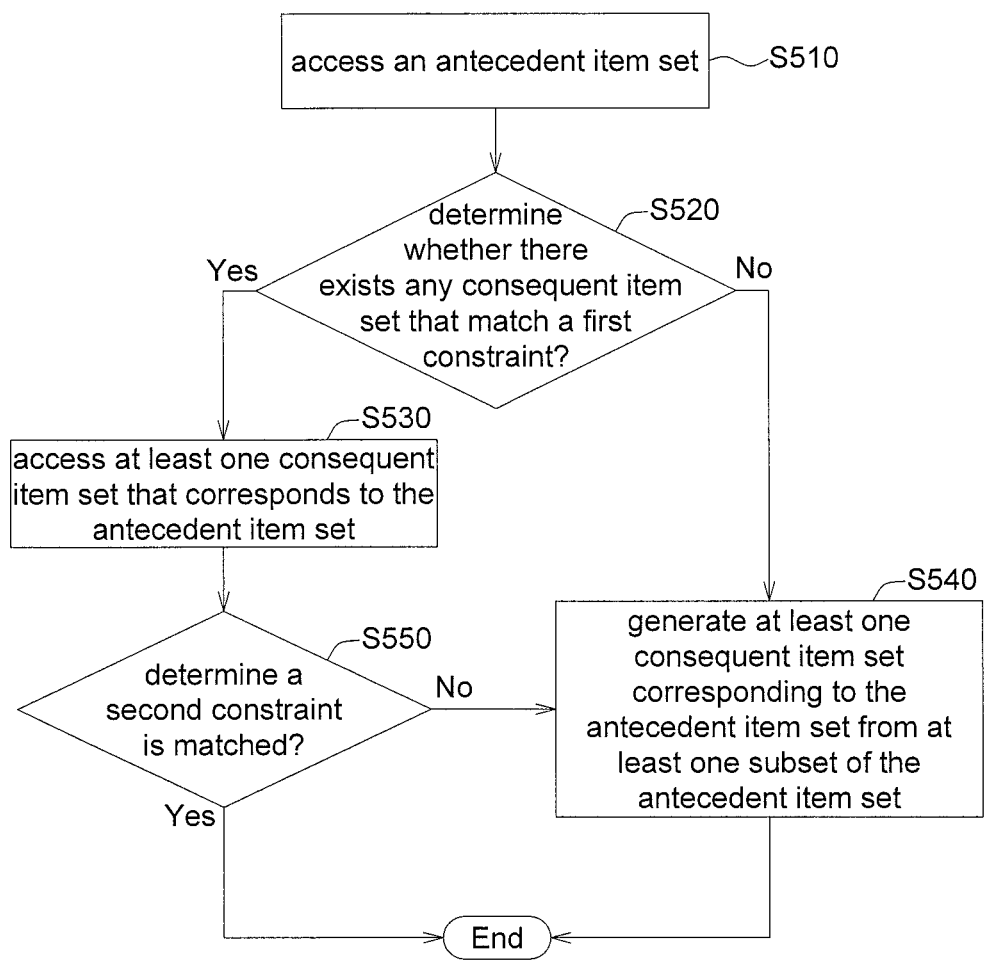
FIG. 5 is a flowchart of a step of providing a consequent item set according to an embodiment of the present disclosure.

Referring to FIG. 5, a flowchart of a step of providing at least one consequent item set according to an embodiment of the present disclosure is shown. In step S510, a user's recent browsing history of commodities on a shopping site, the commodities that the user put into the shopping cart of the shopping site, the websites linked by the user in a session using a web browser, and the multimedia content recently viewed or listened by the user using a multimedia player are used as an antecedent item set, and the consequent item set(s) and the association rules corresponding to the antecedent item set are obtained.

In step S520, whether there exists in the list of established association rules, the list of enhanced association rules or the combined list of association rules any consequent item set that correspond to the antecedent item set and match a first constraint of the consequent item set(s) is determined. For example, the first constraint constructed by the shopper could be constructed as "Handbags and Wallets".

If it is determined that there is at least one consequent item set that correspond to the antecedent item set and match the first constraint existing in the list of established association rules, the list of enhanced association rules or the combined list of association rules, then the method performs step S530. In step S530, the at least one consequent item set that correspond to the antecedent item set and match the first constraint is accessed from the list of established association rules, the list of enhanced association rules or the combined list of association rules.

If it is determined that no consequent item set that correspond to the antecedent item set and match the first constraint exist in the list of established association rules, the list of enhanced association rules or the combined list of association rules, then the method performs step S540. In step S540, the procedure of generating at least one consequent item set corresponding to the antecedent item set according to at least one subset of the antecedent item set as illustrated in steps S410~S430 of FIG. 4 is performed.

In step S530, after the at least one consequent item set corresponding to the antecedent item set is accessed from the list of established association rules, the list of enhanced association rules or the combined list of association rules, if it is determined that the at least one accessed consequent item set does not match a second constraint (the result of determination in step S550 is negative), then the method performs step S540, at least one consequent item set corresponding to the antecedent item set is generated according to at least one subset of the antecedent item set. The second constraint could be constructed as the number of the at least one consequent item set, for example.

Therefore, after the constraints are constructed, if the first constraint (that is, the commodity category) or the second constraint (that is, the number of consequent item sets corresponding to the antecedent item set) is not matched, an enhanced consequent item set and its corresponding enhanced association rules could be generated according to the methods disclosed in the embodiment of the present disclosure, such that the at least one consequent item set corresponding to the antecedent item set could have sufficient number or match the target commodity category.

In the embodiments of the present disclosure, by finding potential and useful association rules between the antecedent item set and the consequent item set, established association rules could be enhanced, and more related antecedent item sets and consequent item sets could be found. Furthermore, the consequent item set corresponding to the subset of the antecedent item set could be generated to enhance the association rules. According to the above embodiments, more highly related consequent item sets could be accessed from the antecedent item set to discover unknown, potential association rules, and enhance the association rules. Thus, after an antecedent item set is given, the problem of having insufficient corresponding consequent item sets and the problem of not having corresponding consequent item set and therefore causing shortage of association rules could be avoided. In commercial applications (such as Internet shopping), the above method for enhancing association rules could be used in the adjustment of commodity items, the design of shelf arrangement or providing recommendation of purchase to effectively promote the sales of commodities and the customer purchase rate. During the manufacturing process of the products, the above method for enhancing association rules could further be used in the machine scheduling plan to increase the yield rate. In medical applications, the above method for enhancing association rules could also be used in the analysis of association degree between the characteristics of diseases to reduce misdiagnoses.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A method for enhancing association rules, performed in an electronic apparatus with a controller, the method comprising:

performing an association rule algorithm to establish a list of established association rules, wherein the list of established association rules comprises at least one antecedent item set, at least one consequent item set and at least one original confidence, the at least one antecedent item set corresponds to the at least one consequent item set and the at least one original confidence one-to-one, and each of the at least one original confidence is defined as a conditional probability of the consequent item set corresponding to the original confidence given the antecedent item set corresponding to the original confidence;

training a model to establish vector(s) of the at least one antecedent item set and vector(s) of the at least one consequent item set according to the list of established association rules, wherein the vector(s) of the at least one antecedent item set corresponds to the at least one antecedent item set one-to-one, and the vector(s) of the at least one consequent item set correspond to the at least one consequent item set one-to-one; and establishing a list of enhanced association rules according to a predictive confidence, the vector(s) of the at least one antecedent item set and the vector(s) of the at least one consequent item set, wherein the predictive confidence is obtained as a dot product between one of the established vector(s) of the at least one antecedent item set and one of the established vector(s) of the at least one consequent item set;

wherein the conditional probability is further established based on the at least one antecedent item set and the at least one consequent item set that are disjoint from each other.

2. The enhancing method according to claim 1, further comprising:

combining the list of established association rules and the list of enhanced association rules to establish a combined list of association rules.

3. The enhancing method according to claim 2, further comprising:

generating at least one subset of the at least one antecedent item set according to the at least one antecedent item set;

obtaining at least one consequent item set corresponding to the at least one subset from the combined list of association rules according to the at least one subset; and sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to a sort order of the at least one sorted consequent item set.

4. The enhancing method according to claim 2, further comprising:

determining, according to a constraint of the at least one consequent item set, whether one of the list of established association rules, the list of enhanced association rules and the combined list of association rules comprises at least one consequent item set corresponding to the at least one antecedent item set and matching the constraint; when it is determined that one of the list of established association rules, the list of enhanced association rules and the combined list of association rules comprises at least one consequent item set corresponding to the at least one antecedent item set and matching the constraint, accessing the at least one consequent item set corresponding to the at least one antecedent item set; when it is determined that none of the list of established association rules, the list of enhanced association rules and the combined list of association rules comprises at least one consequent item set corresponding to the at least one antecedent item set and matching the constraint, generating at least one subset of the at least one antecedent item set according to the at least one antecedent item set, obtaining at least one consequent item set corresponding to the at least one subset from the combined list of association rules according to the at least one subset, and sorting the at least one consequent item set corresponding to the at least one subset according to a predetermined rule, and using at least one part of the at least one consequent item set corresponding to the at least one subset as at least one newly added consequent item set corresponding to the at least one antecedent item set according to the sort order.

5. The enhancing method according to claim 1, wherein the step of performing the association rule algorithm to obtain the list of established association rules comprises:

accessing a plurality of transactions from a source database to obtain a training set;

analyzing the training set to obtain the at least one antecedent item set, the at least one consequent item set, and a corresponding original confidence of each of the at least one antecedent item set and its corresponding consequent item set; and establishing the list of established association rules according to the at least one antecedent item set, the at least one consequent item set and the at least one original confidence.

6. The enhancing method according to claim 1, wherein the step of obtaining the vector(s) of the at least one antecedent item set and the vector(s) of the at least one consequent item set comprises:

(a) performing vector initialization, and then performing the prediction function to obtain the predictive confidence according to the at least one initialized vector(s) of the at least one antecedent item set and the at least one initialized vector(s) of the at least one consequent item set;

(b) determining whether a sum of squared errors between a current predictive confidence and the original confidence is greater than a tolerance value; when it is determined that the sum of squared errors between the current predictive confidence and the original confidence is not greater than the tolerance value, performing step (c); when it is determined that the sum of squared errors between the current predictive confidence and the original confidence is greater than the tolerance value, performing step (d);

(c) using a currently obtained vector(s) of the at least one antecedent item set and a currently obtained vector(s) of the at least one consequent item set as the vector(s) of the at least one antecedent item set and the vector(s) of the at least one consequent item set in the list of enhanced association rules;

(d) adjusting the vector(s) of the at least one antecedent item set and the vector(s) of the at least one consequent item set to re-perform the prediction function to obtain an updated predictive confidence, calculating the sum of squared errors between the updated predictive confidence and a corresponding original confidence, and performing step (b).

7. The enhancing method according to claim 1, further comprising:

generating at least one subset of the at least one antecedent item set according to the at least one antecedent item set;

obtaining at least one consequent item set corresponding to the at least one subset from at least one of the list of established association rules and the list of enhanced association rules according to the at least one subset; and sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to the sort order.

8. The enhancing method according to claim 1, wherein the conditional probability is a ratio of a number of transactions including both the at least one antecedent item set and the at least one consequent item set to a number of transactions including the at least one antecedent item set.

9. An apparatus for enhancing association rules, comprising:
a module for generating established association rules used for establishing a list of established association rules, wherein the list of established association rules comprises at least one antecedent item set, at least one consequent item set and at least one original confidence, the at least one antecedent item set corresponds to the at least one consequent item set and the at least one original confidence one-to-one, and each of the at least one original confidence is defined as a conditional probability of the consequent item set corresponding to the original confidence given the antecedent item set corresponding to the original confidence; and
a module for enhancing association rules used for training a model to establish vector(s) of the at least one antecedent item set and vector(s) of the at least one consequent item set, wherein the vector(s) of the at least one antecedent item set corresponds to the at least one antecedent item set one-to-one, and the vector(s) of the at least one consequent item set correspond to the at least one consequent item set one-to-one,
wherein the module for generating established association rules and the module for enhancing association rules are implemented by a chip, a circuit block in the chip, a firmware circuit, a circuit board having several electronic elements and wires;
wherein a list of enhanced association rules is established according to a predictive confidence, the vector(s) of the at least one antecedent item set and the vector(s) of the at least one consequent item set, wherein the predictive confidence is obtained as a dot product between one of the established vector(s) of the at least one antecedent item set and one of the established vector(s) of the at least one consequent item set;
wherein the conditional probability is further established based on the at least one antecedent item set and the at least one consequent item set that are disjoint from each other.

10. The enhancing apparatus according to claim 9, further comprising:
a module for combining association rules used for combining the list of established association rules and the list of enhanced association rules to establish a combined list of association rules,
wherein the module for combining association rules is implemented by a chip, a circuit block in the chip, a firmware circuit, a circuit board having several electronic elements and wires.

11. The enhancing apparatus according to claim 10, further comprising:
a module for generating subsets of antecedent item set used for generating at least one subset of the at least one antecedent item set according to the at least one antecedent item set;
a module for generating consequent item sets used for obtaining at least one consequent item set corresponding to the at least one subset from the combined list of association rules according to the at least one subset; and
a module for sorting and integrating consequent item sets used for sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to a sort order of the at least one sorted consequent item set,
wherein the module for generating subsets of antecedent item set, the module for generating consequent item sets and the module for sorting and integrating consequent item sets are implemented by a chip, a circuit block in the chip, a firmware circuit, a circuit board having several electronic elements and wires.

12. The enhancing apparatus according to claim 10, further comprising:
determining, according to a constraint of the at least one consequent item set, whether one of the list of established association rules, the list of enhanced association rules and the combined list of association rules comprises at least one consequent item set corresponding to the at least one antecedent item set and matching the constraint; when it is determined that according to the constraint of the at least one consequent item set, one of the list of established association rules, the list of enhanced association rules and the combined list of association rules comprises at least one consequent item set corresponding to the at least one antecedent item set and matching the constraint, accessing the at least one consequent item set corresponding to the at least one antecedent item set; when it is determined that according to the constraint of the at least one consequent item set, none of the list of established association rules, the list of enhanced association rules and the combined list of association rules comprises at least one consequent item set corresponding to the at least one antecedent item set and matching the constraint, generating at least one subset of the at least one antecedent item set according to the at least one antecedent item set, obtaining at least one consequent item set corresponding to the at least one subset from the combined list of association rules according to the at least one subset, and sorting the at least one consequent item set corresponding to the at least one subset according to a predetermined rule, and at least one part of the at least one consequent item set corresponding to the at least one subset is used as at least one newly added consequent item set corresponding to the at least one antecedent item set according to the sort order.

13. The enhancing apparatus according to claim 9, wherein the module for generating established association rules accesses a plurality of transactions from a source database to obtain a training set, analyzes the training set to obtain the at least one antecedent item set, the at least one consequent item set, and a corresponding original confidence of each of the at least one antecedent item set and its corresponding consequent item set, and establishes the list of established association rules according to the at least one antecedent item set, the at least one consequent item set and the at least one original confidence.

14. The enhancing apparatus according to claim 9, wherein the module for enhancing association rules further is used for generating the vector(s) of the at least one antecedent item set and the vector(s) of the at least one consequent item set by:
   (a) performing vector initialization and then performing the prediction function to obtain the predictive confidence according to the at least one initialized vector(s) of the at least one antecedent item set and the at least one initialized vector(s) of the at least one consequent item set;
   (b) determining whether a sum of squared errors between a current predictive confidence and the original confidence is greater than a tolerance value; when it is determined that the sum of squared errors between the current predictive confidence and the original confidence is not greater than the tolerance value, performing step (c); when it is determined that the sum of squared errors between the current predictive confidence and the original confidence is greater than the tolerance value, performing step (d);
   (c) using a currently obtained vector(s) of the at least one antecedent item set and a currently obtained vector(s) of the at least one consequent item set as the vector(s) of the at least one antecedent item set and the vector(s) of the at least one consequent item set used in the list of enhanced association rules;
   (d) adjusting the vector(s) of the at least one antecedent item set and the vector(s) of the at least one consequent item set to re-perform the prediction function to obtain an updated predictive confidence and calculating the sum of squared errors between the updated predictive confidence and a corresponding original confidence; and performing step (b).

15. The enhancing apparatus according to claim 9, further comprising:
   a module for generating subsets of antecedent item set used for generating at least one subset of the at least one antecedent item set according to the at least one antecedent item set;
   a module for generating consequent item sets for obtaining at least one consequent item set corresponding to the at least one subset from at least one of the list of established association rules and the list of enhanced association rules according to the at least one subset; and
   a module for sorting and integrating consequent item sets used for sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to a sort order of the at least one sorted consequent item set,
   wherein the module for generating subsets of antecedent item set, the module for generating consequent item sets and the module for sorting and integrating consequent item sets are implemented by a chip, a circuit block in the chip, a firmware circuit, a circuit board having several electronic elements and wires.

16. The enhancing apparatus according to claim 9, wherein
   the conditional probability is a ratio of a number of transactions including both the at least one antecedent item set and the at least one consequent item set to a number of transactions including the at least one antecedent item set.

17. A non-transitory computer readable medium having a software program stored therein, wherein when the software program is performed, an electronic apparatus with a controller performs a method for enhancing association rules, the method comprising:
   performing an association rule algorithm to establish a list of established association rules, wherein the list of established association rules comprises at least one antecedent item set, at least one consequent item set and at least one original confidence, the at least one antecedent item set corresponds to the at least one consequent item set and the at least one original confidence one-to-one, and each of the at least one original confidence is defined as a conditional probability of the consequent item set corresponding to the original confidence given the antecedent item set corresponding to the original confidence;
   training a model to establish vector(s) of the at least one antecedent item set and vector(s) of the at least one consequent item set according to the list of established association rules, wherein the vector(s) of the at least one antecedent item set corresponds to the at least one antecedent item set one-to-one, and the vector(s) of the at least one consequent item set correspond to the at least one consequent item set one-to-one; and
   generating a list of enhanced association rules according to a predictive confidence, the vector(s) of the at least one antecedent item set and the vector(s) of the at least one consequent item set, wherein the predictive confidence is obtained as a dot product between one of the established vector(s) of the at least one antecedent item set and one of the established vector(s) of the at least one consequent item set;
   wherein the conditional probability is further established based on the at least one antecedent item set and the at least one consequent item set that are disjoint from each other.

18. The non-transitory computer readable medium according to claim 17, wherein the enhancing method further comprises:
   combining the list of established association rules and the list of enhanced association rules to establish a combined list of association rules.

19. The non-transitory computer readable medium according to claim 18, the enhancing method further comprises:
   generating at least one subset of the at least one antecedent item set according to the at least one antecedent item set;
   obtaining at least one consequent item set corresponding to the at least one subset from the combined list of association rules according to the at least one subset; and
   sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to a sort order of the at least one sorted consequent item set.

20. The non-transitory computer readable medium according to claim 18, wherein the enhancing method further comprises:

determining, according to a constraint of the at least one consequent item set, whether one of the list of established association rules, the list of enhanced association rules and the combined list of association rules comprises at least one consequent item set corresponding to the at least one antecedent item set and matching the constraint; when it is determined that according to the constraint of the at least one consequent item set, one of the list of established association rules, the list of enhanced association rules and the combined list of association rules comprises at least one consequent item set corresponding to the at least one antecedent item set and matching the constraint, accessing the at least one consequent item set corresponding to the at least one antecedent item set; when it is determined that according to the constraint of the at least one consequent item set, none of the list of established association rules, the list of enhanced association rules and the combined list of association rules comprises at least one consequent item set corresponding to the at least one antecedent item set and matching the constraint, generating at least one subset of the at least one antecedent item set according to the at least one antecedent item set, obtaining at least one consequent item set corresponding to the at least one subset from the combined list of association rules according to the at least one subset, and sorting the at least one consequent item set corresponding to the at least one subset according to a predetermined rule, and at least one part of the at least one consequent item set corresponding to the at least one subset is used as at least one newly added consequent item set corresponding to the at least one antecedent item set according to the sort order.

21. The non-transitory computer readable medium according to claim 17, wherein in the enhancing method, the step of performing the association rule algorithm to obtain the list of established association rules comprises:

accessing a plurality of transactions from a source database to obtain a training set;

analyzing the training set to obtain the at least one antecedent item set, the at least one consequent item set, and a corresponding original confidence of each of the at least one antecedent item set and its corresponding consequent item set; and establishing the list of established association rules according to the at least one antecedent item set, the at least one consequent item set and the at least one original confidence.

22. The non-transitory computer readable medium according to claim 17, wherein in the enhancing method, the step of obtaining the vector(s) of the at least one antecedent item set and the vector(s) of the at least one consequent item set comprises:

(a) performing vector initialization and then performing the prediction function to obtain the predictive confidence according to the at least one initialized vector(s) of the at least one antecedent item set and the at least one initialized vector(s) of the at least one consequent item set;

(b) determining whether a sum of squared errors between a current predictive confidence and the original confidence is greater than a tolerance value; when it is determined that the sum of squared errors between the current predictive confidence and the original confidence is not greater than the tolerance value, performing step (c); when it is determined that the sum of squared errors between the current predictive confidence and the original confidence is greater than the tolerance value, performing step (d);

(c) using a current obtained vector(s) of the at least one antecedent item set and a current obtained vector(s) of the at least one consequent item set as the vector(s) of the at least one antecedent item set and the vector(s) of the at least one consequent item set used in the list of enhanced association rules;

(d) adjusting the vector(s) of the at least one antecedent item set and the vector(s) of the at least one consequent item set to re-perform the prediction function to obtain an updated predictive confidence and calculating the sum of squared errors between the updated predictive confidence and a corresponding original confidence; and performing step (b).

23. The non-transitory computer readable medium according to claim 17, the enhancing method further comprises:

generating at least one subset of the at least one antecedent item set according to the at least one antecedent item set;

obtaining at least one consequent item set corresponding to the at least one subset from at least one of the list of established association rules and the list of enhanced association rules according to the at least one subset; and sorting the at least one consequent item set corresponding to the at least one subset according to a predetermined rule, and then using at least one part of the at least one consequent item set corresponding to the at least one subset as at least one newly added consequent item set corresponding to the at least one antecedent item set according to the sort order.

24. The non-transitory computer readable medium according to claim 17, wherein the conditional probability is a ratio of a number of transactions including both the at least one antecedent item set and the at least one consequent item set to a number of transactions including the at least one antecedent item set.

* * * * *